S. & W. SCOTT.
Tree-Protector.

No. 219,987. Patented Sept. 23, 1879.

WITNESSES:
W. W. Hollingsworth
Amos W. Hart

INVENTOR:
S. Scott
W. Scott
BY
ATTORNEYS.

UNITED STATES PATENT OFFICE.

SAMUEL SCOTT AND WINFIELD SCOTT, OF FLOYD COURT-HOUSE, VIRGINIA.

IMPROVEMENT IN TREE-PROTECTORS.

Specification forming part of Letters Patent No. 219,987, dated September 23, 1879; application filed May 2, 1878.

*To all whom it may concern:*

Be it known that we, S. SCOTT and W. SCOTT, of Floyd Court-House, in the county of Floyd and State of Virginia, have invented a new and Improved Tree-Protector; and we do hereby declare that the following is a full, clear, and exact description of the same.

Our invention is an improvement in the class of devices attached to trunks of trees for the purpose of protecting the latter from injury by worms, borers, and other insects or animals.

The device we employ is made of sheet metal, and has a conical form.

The feature which constitutes the novelty of our invention is the construction and combination of parts whereby the protector is adapted for adjustment in diameter or size, hereinafter described.

Figure 1:
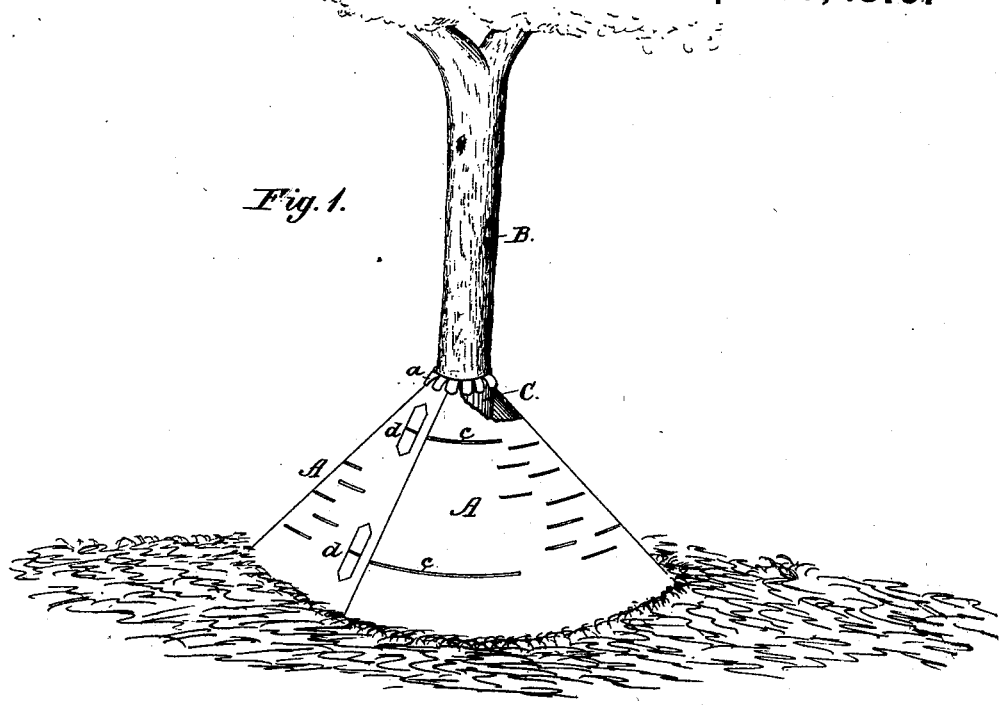
Figure 2:
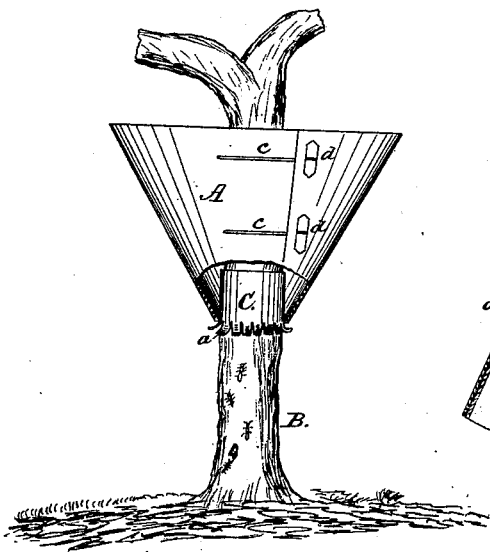
Figure 3:
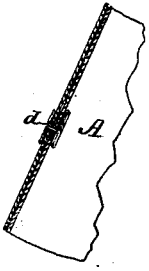
Figure 4:
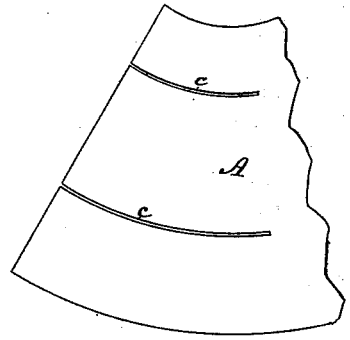

In accompanying drawings, Figure 1 is a side view of the protector applied to the base of a tree-trunk. Fig. 2 represents the device applied to a tree-trunk in an inverted position. Fig. 3 is a detail cross-section, and Fig. 4 is a plan view of a fragment of the protector extended flat.

The conical sheet-metal protector A may be made in two parts, and perforated to admit air and light when designed to be placed about the lower portion of a tree-trunk, B, and its base set in the earth, as shown in Fig. 1; or it may be made of one piece, and imperforate, when intended to be used in inverted position, and attached to the upper portion of a tree-trunk, B, as shown in Fig. 2. We use it thus inverted when we desire to apply a fertilizer, the requisite quantity of the latter being in such case placed in the protector, and allowed to escape downward by the dissolving action of moisture. In either position the trunk B of the tree is protected by a cylinder or band, C, which is formed of a strip of sheet metal wrapped or folded upon itself, and having a serrated edge, $a$, to adapt it for support on the protector A, as in Fig. 1, or to support the protector, as in Fig. 2. The protector is made expansible by means of circumferential parallel open slots or slits $c$ and clips or clasps $d$. The slits are made in one of its edges, near the top and bottom, and the clasps $d$ are attached to the other edge in corresponding position. The slits extend a considerable distance from the edge, and the diameter of the protector may be increased or diminished to a corresponding extent, since the heads of the clasps $d$ enter and slide in the slits $c$.

To apply the protector to a tree-trunk, its lapped edges are separated to receive the latter, and then brought together, and the heads of the clasps $d$ inserted in the slits $c$, and the edges of the protector slid one on the other until the upper end of the protector fits snugly around the trunk.

If required, the clasps $d$ may then be tightened in order to hold the lapped edges rigidly in that position.

The construction of the clasps adapts them for this function, they being formed of narrow strips of thin sheet metal doubled and otherwise constructed like the paper-clip in common use.

When it is desired to open or entirely remove the protector for any purpose—as, for example, to allow inspection of the tree-trunk, or for cultivation of the soil about it, or for application of fertilizing material—its lapped edges are drawn apart by sliding one on the other, until the heads of the clasps have passed out of the slots or slits $c$.

It will thus be seen that the slits allow convenient attachment, detachment, and adjustment of the protector without in any manner affecting its efficiency otherwise.

While we prefer to construct the protector of sheet metal, it may be made of paper, wire-cloth, rubber, &c.

What we claim is—

The improved protector for trees, consisting of a sheet-metal cone divided lengthwise, and having circumferential open slots or slits $c$ in one edge, and the clasps $d$ attached to the opposite edge, as shown and described, so that when said edges are lapped the clasps will enter the slits and secure the edges together, and also permit adjustment of the protector, as specified.

SAMUEL SCOTT.
WINFIELD SCOTT.

Witnesses:
J. M. BOYD,
O. HUNNIGAN.